Patented Feb. 25, 1941

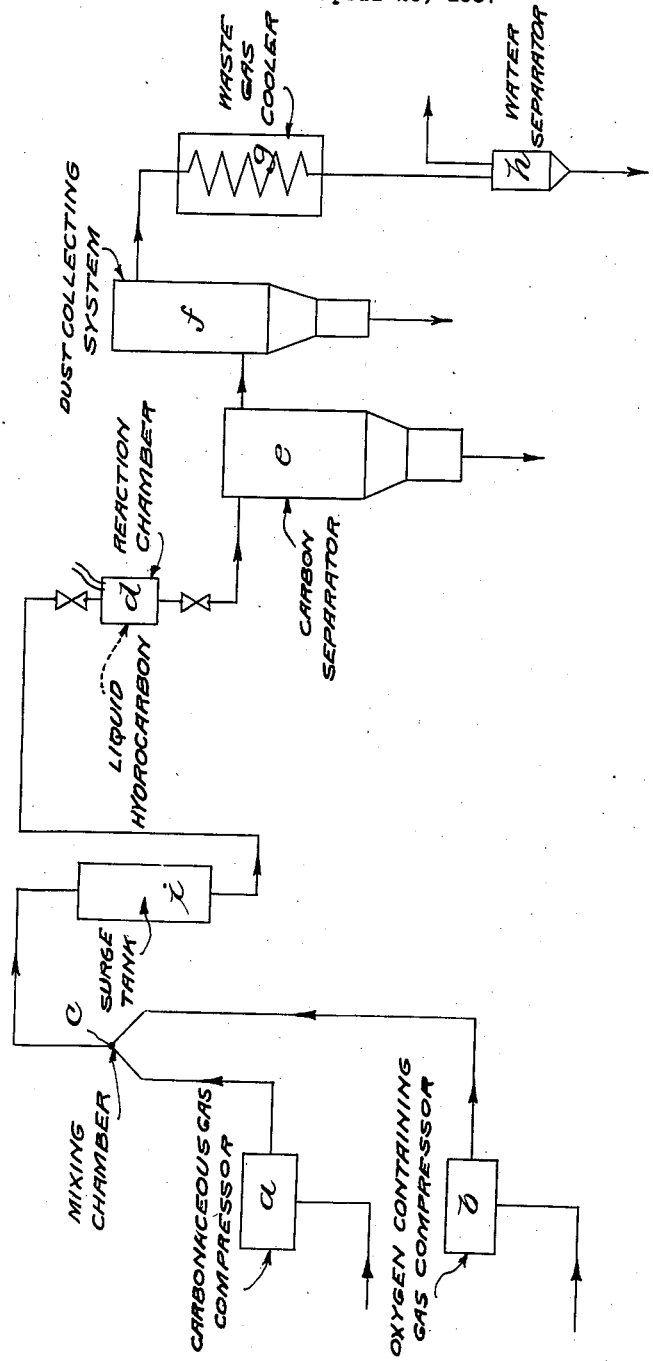

2,232,747

UNITED STATES PATENT OFFICE 2,232,747

METHOD FOR PRODUCING HIGH QUALITY CARBON BLACK

Lajos von Szeszich, Frankfort-on-the-Main, and Egbert Dittrich, Mainz, Germany, assignors, by mesne assignments, to Chemical Marketing Company Inc., New York, N. Y.

Application April 29, 1937, Serial No. 139,714
In Germany May 8, 1936

6 Claims. (Cl. 23—209.7)

The present invention relates to a method of producing high quality carbon black from gaseous hydrocarbons, and, particularly, to an improved method for producing high quality carbon black from hydrocarbon gases wherein liquid hydrocarbons are admixed in critical proportions.

Heretofore, many processes for producing carbon black have been used. Thus, carbon black has been produced from acetylene, ethylene or their mixtures with each other, with methane or with other hydrocarbons. Recently, a very successful and efficient process has been introduced for the production of carbon black involving the explosion of hydrocarbon gas mixtures containing predetermined amounts of oxygen, the explosive decomposition being carried out at normal or at elevated pressures. It has been found that a high quality carbon black can be produced by exploding mixtures of such hydrocarbons with a quantity of oxygen considerably greater than the minimum required for the formation of an explodible mixture at elevated pressures. In order to increase the output of the apparatus, the explosions were produced in rapid succession so that the carbon black produced was removed from the reaction chamber by the rapid expansion of the residual gases. Generally, a surge or storage tank was interposed between the mixing device and the reaction chamber. By means of this surge tank, the pressure was maintained practically constant. From the surge tank, the mixture was passed to the reaction or explosion chamber by suitable inlet and conduit means. In the reaction chamber, the explodible mixture was ignited by conventional ignition means such as a spark plug, incandescent wire, or in some cases merely by the high compression of the mixture. A process of the aforesaid character has been disclosed in the copending application of Lajos von Szeszich, Serial No. 33,824, filed July 30, 1935.

It is an object of the present invention to provide an improved method of producing high quality carbon black from a mixture of gaseous hydrocarbons and liquid hydrocarbons.

It is another object of the present invention to provide an improved method of producing high quality carbon black from mixtures of gaseous hydrocarbons and liquid hydrocarbons in which the liquid hydrocarbons are admixed in a definite and critical proportion with the gaseous hydrocarbons.

It is a further object of the present invention to provide an improved method for producing high quality carbon black from mixtures of liquid hydrocarbons and gaseous hydrocarbons in which the quantity of oxygen bearing gases employed is admixed in critical amounts depending upon the carbon content of the gaseous hydrocarbons.

The present invention also contemplates an improved method for increasing the productive capacity of a given installation for the production of high quality carbon black from gaseous hydrocarbons.

Other objects and advantages will become apparent from the following description.

It has now been discovered that many advantages accrue from the use of critical quantities of liquid hydrocarbons in addition to hydrocarbon gases combined with the use of a regulated amount of oxygen-containing gases. The critical amount of oxygen rquired for the production of a high quality carbon black bears a definite relation to the carbon content of the gaseous hydrocarbons employed in the improved process.

In general, the process may be carried out on an industrial scale in any apparatus in which a rapid succession of explosions of the gaseous and liquid hydrocarbons in the presence of a large amount of oxygen may be secured. For example, hydrocarbon gases may be compressed in any suitable manner. Oxygen or oxygen-containing gases may be compressed to the desired pressure in any appropriate compressor or similar equipment. The compressed gases are mixed in a suitable device in such proportions that the quantity of oxygen present is sufficient for complete oxidation of all the carbon present in the gaseous hydrocarbons. The mixed gases are then introduced into a reaction chamber of suitable proportions and design. Before the ignition of the explosive mixture, or during the resultant combustion, liquid hydrocarbons are sprayed or atomized and introduced as a mist into the reaction chamber in quantities dependent upon the carbon content of the gaseous hydrocarbons employed. The reaction or explosion chamber is closed, and kept closed during the combustion. After each explosion, the reaction chamber is opened and the carbon black produced expelled by the rapid, practically adiabatic, expansion of the residual gases. The residual gases contain carbon monoxide and hydrogen. It has been found desirable to employ a surge or storage tank between the mixing device and the reaction chamber.

In mixing the gaseous hydrocarbons and the oxygen-containing gases the quantity of oxygen present in the gaseous mixture before introduction into the explosion chamber should be sufficient for complete combustion of all the carbon in the gaseous mixture.

The liquid hydrocarbons may be mineral oils, tars, and distillation, extraction and conversion products of tars and similar hydrocarbons. It is preferred to utilize the liquid hydrocarbons in such quantities that the carbon present in the liquid hydrocarbons is in the ratio of less than 1 and preferably less than 0.5 with respect to the quantity of carbon of the gaseous hydrocarbons employed.

In filling the reaction chamber, it is preferred to continue the filling of the explosion chamber until a pressure of about 5 atmospheres is attained.

In carrying the present invention into practice on an industrial scale, the following procedure has given satisfactory results.

A gas fraction obtained by the decomposition of coke oven gas is mixed with oxygen-containing gases after each gas has been compressed. The mixed compressed gases are introduced into a reaction chamber and treated together with a liquid coal tar heating oil. The oil is injected into the reaction chamber after the gas mixture has been introduced and before ignition or during the combustion which results from the ignition. Injection of the oil is by means of a pump and through a nozzle similar to those employed in Diesel engines or by means of any similar device. The carbon content of such a gas fraction is about 670 grams per cubic meter. The quantity of oxygen is so adjusted that about 800 liters of oxygen or their equivalent of oxygen-containing gases are employed for each kilogram of carbon in the gas fraction. The initial pressure is about 5 atmospheres and the reaction chamber is operated at the rate of about 100 explosions per minute. Preferably, the reaction chamber is filled with the gas mixture up to the desired pressure before each explosion and the oil is injected through a nozzle into the reaction chamber by means of a pump. The quantity of oil injected is adjusted in accordance with the carbon content of the gas and in a ratio of less than 1. That is, the ratio of the carbon content of the oil to the carbon content of the gas is adjusted to be less than 1 and preferably less than 0.5.

The following proportions have given satisfactory results. A gas fraction containing about 670 grams of carbon per cubic meter was employed. Of this gas fraction about 5.9 cubic meters were employed and mixed with about 3.3 cubic meters of oxygen. These values are stated in terms of volumes at normal temperature and pressure as those skilled in the art will appreciate, the foregoing mixture contains about 40 volume per cent of oxygen. Furthermore, as those skilled in the art know, this quantity of oxygen theoretically is sufficient to convert about 90% or substantially all of the carbon present in the aforesaid gas mixture to carbon monoxide. About 0.7 kilogram of liquid hydrocarbon was admixed. The carbon content of such a liquid hydrocarbon is about 900 grams per kilogram of liquid fuel. From this reaction about 1 kilogram of carbon black was obtained together with residual gas containing carbon monoxide and hydrogen with a calorific value practically equal to that of the original gas fraction.

For purposes of comparison with the former explosion process the following tabulation is included:

|  | Improved process | Prior process |
|---|---|---|
| Volume of hydrocarbon gases employed _____ cu. m__ | 5.9 | 12.0 |
| Carbon content of hydrocarbon gases employed per cu. m _____ grams__ | 670 | 670 |
| Volume of oxygen employed _____ cu. m__ | 3.3 | 6.8 |
| Kilograms of liquid hydrocarbon _____ | 0.7 | 0.0 |
| Kilograms of high quality carbon black produced _____ | 1.0 | 1.0 |

It is to be observed that the admixture of liquid hydrocarbons reduces the volume of gas to be compressed and pumped for a given production of carbon black. Furthermore, the quantity of carbon black per unit of reaction chamber capacity is doubled. That is, when liquid hydrocarbons are admixed the amount of carbon black of high quality produced per liter of reaction chamber capacity is about 0.72 gram. Whereas when liquid hydrocarbons are not admixed the production of carbon black is reduced to about 0.35 gram per liter of reaction chamber capacity. Another advantage derived from the use of liquid hydrocarbons in addition to gaseous hydrocarbons is an increased diversity of sources of hydrocarbons. As a result, a carbon black plant may be operated with reduced costs due to the availability of a greater number of raw materials which may be utilized in accoradance with the comparative costs of possible sources of carbon.

It has been found that although the carbon black produced in accordance with the principles of the present invention may contain small quantities of oily materials in accordance with the liquid hydrocarbons employed yet the presence of these small quantities of oily substances does not reduce the value of the carbon black to any measurable extent when the carbon black is used as rubber carbon for example. However, if desired, these oily constituents or contaminants may be removed by extraction with benzene, acetone or similar solvents or may be removed by heating the carbon black to about 250° C. to about 400° C. in a stream of inert gas, steam or vapors.

Although the present invention has been described in conjunction with a preferred procedure of carrying the improved process into practice, it is to be understood that variations and modifications may be resorted to as those skilled in the art will readily understand. Such variations and modifications are considered to be within the purview of the specification and scope of the appended claims.

We claim:

1. The improved method for producing high quality carbon black by explosion which comprises compressing an hydrocarbon gas fraction containing about 670 grams of carbon per cubic meter, compressing oxygen containing gases, establishing a substantial body comprising a mixture of said compressed hydrocarbon gases and said oxygen-containing gases wherein said compressed gases are in the ratio of about 5.9 cubic meters of hydrocarbon gases to about 3.3 cubic meters of oxygen both volumes being measured at normal temperature and pressure, introducing a portion of said mixture into a reaction chamber under pressure, introducing about 0.7 kilogram of liquid hydrocarbon containing about 900 grams of carbon per kilogram of liquid hydrocarbon, and reacting the hydrocarbons and the oxygen containing gases at an initial pressure of about 5 atmospheres whereby about 1 kilogram of high quality carbon black is produced.

2. The improved method for producing high quality carbon black by explosion which comprises introducing a mixture of hydrocarbon gases containing about 670 grams of carbon per cubic meter and oxygen containing gases into a reaction chamber, said mixture containing about 800 liters of oxygen for each kilogram of carbon present in the mixture at an initial pressure of about 5 atmospheres and exploding said mixture whilst introducing a quantity of liquid hydrocarbon into said reaction chamber having a carbon content such that the ratio of carbon introduced in said liquid hydrocarbon to the carbon in said gases is less than 1:1, whereby about 1 kilogram of high quality carbon black is produced.

3. The improved method for producing high quality carbon black by explosion which comprises introducing a mixture of hydrocarbon gases and oxygen-containing gases into a reaction chamber at an initial pressure of about 5 atmospheres, said mixture containing about 40% oxygen, introducing sufficient liquid hydrocarbon into said reaction chamber to provide a ratio of carbon in said liquid hydrocarbon to carbon in said gases of less than 1:1 and reacting said hydrocarbons and said oxygen, whereby substantially twice as much high quality carbon black is produced as can be obtained from said hydrocarbon gases alone.

4. The improved process for producing high quality carbon black by explosion which comprises introducing a mixture of hydrocarbon gases and oxygen-containing gases into a reaction chamber, said mixture containing sufficient oxygen to convert about 90% of the carbon present to carbon monoxide, introducing sufficient liquid hydrocarbon into said reaction chamber to provide a ratio of carbon in said liquid hydrocarbon to carbon in said gases of less than 0.5:1, compressing said gases to a reaction pressure of at least about 5 atmospheres, and reacting said mixture whereby an increased amount of high quality carbon black is produced.

5. The improved process for producing high quality carbon black by explosion which comprises introducing a mixture of hydrocarbon gases and oxygen-containing gases into a reaction chamber, said mixture containing sufficient oxygen to convert about 90% of the carbon present to carbon monoxide, introducing sufficient liquid hydrocarbon into said reaction chamber while reacting said gas mixture at a reaction pressure of at least about 5 atmospheres to provide a ratio of carbon in said liquid hydrocarbon to carbon in said gases of less than 1:1, and recovering carbon black, whereby high quality carbon black is produced in increased amounts.

6. The improved process for producing high quality carbon black by explosion which comprises introducing a mixture of hydrocarbon gases and oxygen-containing gases into a reaction chamber, said mixture containing sufficient oxygen to convert practically all of the carbon present to carbon monoxide, introducing sufficient liquid hydrocarbon into said reaction chamber to provide a ratio of carbon in said liquid hydrocarbon to carbon in said gases of less than 0.5:1, compressing said gases to a reaction pressure of at least about 5 atmospheres, and reacting said mixture whereby an increased amount of high quality carbon black is produced.

LAJOS von SZESZICH.
EGBERT DITTRICH.